United States Patent [19]

Iwamoto et al.

[11] 3,984,491

[45] Oct. 5, 1976

[54] AGENT FOR IMPROVING WEATHERABILITY OF SYNTHETIC RESIN

[75] Inventors: Kyoichi Iwamoto; Hiroshi Kakei, both of Shinnan-yoshi, Japan

[73] Assignee: Tokiyama Sekisui Kogyo Kabushiki Kaisha, Osaka, Japan

[22] Filed: Mar. 21, 1975

[21] Appl. No.: 560,778

[30] Foreign Application Priority Data

Mar. 27, 1974 Japan.............................. 49-34833

[52] U.S. Cl....................... 260/837 PV; 260/18 R; 260/18 PF; 260/830 TW; 260/835; 260/836
[51] Int. Cl.².................. C08G 49/04; C08G 45/04
[58] Field of Search.................. 260/47, 836, 837 R, 260/837 PV

[56] References Cited
UNITED STATES PATENTS

| | | | |
|---|---|---|---|
| 3,377,406 | 4/1968 | Newey et al. | 260/837 R |
| 3,506,736 | 4/1970 | Najuar | 260/837 R |
| 3,773,856 | 11/1973 | Takiyama et al. | 260/836 |

*Primary Examiner*—Theodore E. Pertilla
*Attorney, Agent, or Firm*—Armstrong, Nikaido & Wegner

[57] ABSTRACT

Compositions for improving the weatherability of synthetic resins are prepared by modifying an epoxy resin with at least one acid selected from the group consisting of cinnamic acid, α-methylcinnamic acid and o-coumaric acid. The addition of such agents to synthetic resins provides a resulting resin which has improved weatherability, transparency and thermal stability.

3 Claims, No Drawings

AGENT FOR IMPROVING WEATHERABILITY OF SYNTHETIC RESIN

DETAILED EXPLANATION OF INVENTION

This invention relates to a composition for improving the weatherability of synthetic resins which comprises, as a main component, an epoxy resin modified by at least one acid selected from the group consisting of cinnamic acid, α-methylcinnamic acid and o-coumaric acid.

In recent years, various synthetic resins have been developed along with the development of petrochemical industries, and are now used in various applications. In general, however, the synthetic resins have the characteristic to tending to deteriorate as to physical and chemical properties when exposed to ultraviolet rays. For instance, an article of the synthetic resin gradually turns to a yellow color and develops cracks when used in the open air for a long period of time. In order to prevent such deterioration, there is normally added to the resin a composition which is called an agent for improving weatherability.

The composition for improving weatherability has hitherto been made of an ultraviolet ray absorber, for example, benzophenone derivatives such as 2-hydroxy-benzophenone and 2,2′,4-trihydroxy-benzophenone, salicylates such as p-octylphenyl salicylate, dodecyl salicylate and benzotriazoles such as 2-(2′-hydroxy-3′,-5′-di-tert-butylphenyl) benzotriazole. The ultraviolet ray absorber was added ordinarily in an amount of 0.1 to 1.0 part by weight per 100 parts by weight of the synthetic resin.

However, most of these known agents for improving weatherability are expensive and highly toxic. Because of such toxicity, the amount of the known agents should be limited to a low level when they are used, for example, in containers for food.

The inventors have searched for an agent for improving weatherability of synthetic resins, which agent is more moderate in price and less toxic than those hitherto known, and found that a series of cinnamic acids such as cinnamic acid, α-methylcinnamic acid and o-coumaric acid have an excellent effect upon improving weatherability. The said series of cinnamic acids, however, produces a strong smell such that the use of the series of cinnamic acids pollutes the working environment. The inventors continued the investigation and now have discovered that a modified resin, or a reaction product obtained by reacting at least one of cinnamic acid, α-methylcinnamic acid or o-coumaric acid with an epoxy resin has an excellent effect upon improving weatherability and does not give out a strong smell. Moreover, said modified resin, or said reaction product is superior in effect to the use of cinnamic acid, α-methylcinnamic acid or o-coumaric acid alone and, in addition, said modified resin has an improving effect on transparency or thermal stability of synthetic resins in contrast with the use of said series of cinnamic acids alone, which injure thermal stability of synthetic resin. Such an agent for improving weatherability has never been available which has the various effects mentioned above.

The epoxy resin modified by at least one of cinnamic acid, α-methylcinnamic acid or o-coumaric acid used in this invention may be prepared by any appropriate means ordinarily used to prepare an ester of epoxy resin with an organic acid, for example, by mixing at least one of cinnamic acid, α-methylcinnamic acid or o-coumaric acid with epoxy resin (not completely hardened) and heating at 50 to 300°C for 0.5 to 30 hours. Solvents which can dissolve both epoxy resin and cinnamic acid, α-methylcinnamic acid or o-coumaric acid (such as toluene and xylene), and do not prevent the reaction may be used in the reaction.

The expression "epoxy resin" as used herein includes glycidyl epoxy resins such as bisphenol-A-glycidyl ether, glycerol triglycidyl ether, epoxidized vegetable oils such as epoxidized linseed oil, epoxidized soybean oil and alicyclic epoxy resin. Cinnamic acid, α-methylcinnamic acid and o-coumaric acid may either be natural or synthetic.

Since hydroxyl groups were detected in the modified resin by infrared spectra and thin-layer chromatography, cinnamic acid, α-methylcinnamic acid or o-coumaric acid is considered to react mainly with epoxy groups of the epoxy resin. On the other hand, it is desirable that unreacted cinnamic acid, α-methylcinnamic acid or o-coumaric acid should not remain in the modified resin. Therefore, it is advisable that an amount of cinnamic acid, α-methylcinnamic acid or o-coumaric acid less than the amount corresponding to a number of epoxy groups in a molecule of epoxy resin is used. For instance, as epoxidized linseed oil has three epoxy groups in a molecule, it is preferable to use less than three moles of cinnamic acid, α-methylcinnamic acid or o-coumaric acid upon one mole of epoxidized linseed oil.

The agent for improving weatherability of the invention is suitable for use with either thermoplastic resins including vinyl chloride resin such as polyvinyl chloride, vinyl chloride-ethylene copolymer, a graft copolymer prepared by grafting vinyl chloride on ethylene-vinyl acetate copolymer, chlorinated vinyl chloride and acrylic resin such as polymethyl methacrylate, acrylate acid-methacrylate copolymer, or thermosetting resins including unsaturated polyester resin and epoxy resin.

It is desirable to use the epoxy resin modified by at least one of cinnamic acid, α-methylcinnamic acid and o-coumaric acid in a ratio of 1.0 –5.0 parts by weight upon 100 parts by weight of synthetic resin. The said modified resin may be added prior to the polymerization, or at a time simultaneously when other auxiliary ingredients are added to the polymer already formed, and also in a form of solution using a suitable solvent.

The agent for improving weatherability of this invention may be used together with other auxiliary ingredients such as plasticizers, fillers, stabilizers, lubricants, pigments and the other known agents for improving weatherability which are usually added to synthetic resins.

The following preparations will serve to illustrate preparative examples for the epoxy resin modified by at least one of cinnamic acid, α-methylcinnamic acid or o-coumaric acid which is used in the invention. The following examples and comparative examples will serve to illustrate the advantages of the agent for improving weatherability of the invention and the effects thereof which can be compared favorably with that known in the art. In the following illustration, the term "part" means "part of weight".

Tests were conducted with the resinous mixtures obtained in the examples and comparative examples in order to confirm the effects of the agent for improving weatherability of the invention, and the testing methods were as follows:

a. Odor when kneaded:

Evaluated by the emission or strength of a stimulating odor when the resinous mixture was kneaded by means of rolls.

b. Coloring by irradiation with a sterilization lamp:

A resinous plate which was obtained by mixing a resin with auxiliary ingredients, kneading the resultant mixture with heated mixing rolls, forming said mixture into sheets and, if necessary, pressing the sheets with a heated press to form a plate of curing them on a glass plate, was irradiated with a sterilization lamp (Tokyo Shibaura Electric Co., 15W) from a distance of 15 cm for 8 or 16 hours, and coloring of the plate, if any, was evaluated.

c. Coloring by irradiation with a sunshine carbon arc tester:

The same resinous plate described in (b) was irradiated with a sunshine carbon arc tester (Tokyorika Co., WE-SUN-HC type) for 200 hours, and coloring, if any, was evaluated. The test was carried out under the following conditions.

Arc current: 50 A
Temperature of black panel: 63 ±5°C
Rain time: 12 minutes (per 120 minutes)

In coloring tests (b) and (c), the degree of coloring was indicated as follows:

A.: hardly changed
B.: slight brown
C.: light brown
D.: brown
E.: deep brown d. Transparency:

Evaluated by transparency of the plate.

e. Blackening time at 180°C (or thermal stability):

The plate was placed in a Geer's oven heated to 180°C (inside temperature) and observed every 10 minutes by removing the plate from the oven until blackened.

Preparation 1

Into a Teflon (Trademark) cylinder were placed 35 g (0.1 mole) of epoxy resin of bisphenol A glycidyl ether type (Shell Chemical Co., Trademark:Epikote No. 815) and 15 g (0.1 mole) of cinamic acid (Wako Chemical Co.,) and the ingredients were thoroughly mixed. The upper end of the cylinder was sealed. The cylinder was dipped in an oil bath of 200°C and the reaction was carried out for 10 hours under stirring. The reaction mixture, which had been a white viscous liquid at the start when the resin and cinnamic acid had been mixed, changed into a pale yellow and a somewhat soft solid when the reaction was completed. (The hot, clear reaction mixture at the 3rd or 6th hour became turbid on cooling, indicating an incomplete reaction. On the contrary, the reaction product after the complete reaction was quite clear on cooling.)

An analysis was conducted to determine whether or not the reaction had been completed and showed that unreacted cinnamic acid was present in the amount less than 1 percent by weight. In addition, the infrared spectrum of the product showed major peaks of ester as well as hydroxyl groups and no peak for carboxyl groups. Also, the thin-layer chromatography test indicated the presence of epoxy resin modified by cinnamic acid and little unreacted cinnamic acid.

Preparation 2

A reaction was carried out by 200°C for 10 hours using 60g (0.1 mole) of epoxidized linseed oil (Adeka Argus Chemical Co. Trademark:Adekacizen 0-180) and 15 g (0.1 mole) of cinnamic acid in a manner similar to Preparation 1. A clear, yellow, somewhat soft solid was obtained after complete reaction, instead of white turbid mixture obtainable in an incomplete reaction.

An analysis was conducted to determine whether or not the reaction had been completed, and it was found that the unreacted cinnamic acid was present in an amount less than 2 percent by weight. Both the infrared spectrum and the thin-layer chromatography tests showed the presence of epoxidized linseed oil modified by cinnamic acid.

Preparation 3

A reaction was carried out at 200°C for 10 hours using 30 g (0.1 mole) of epoxy resin of glycerol triglycidyl ether type (Shell Chemical Co., Trademark: Epikote No. 812) and 15 g (0.1 mole) cinnamic acid in a manner similar to Preparation 1. A clear, yellow, somewhat soft solid was obtained.

An analysis was conducted to determine whether or not the reaction had been completed and showed that unreacted cinnamic acid was present only in an amount of less than 1 percent by weight. Both the infrared spectrum and the thin-layer chromatography tests show the presence of epoxy resin modified by cinnamic acid.

Preparation 4

A reaction was carried out at 200°C for 10 hours using 30 g (0.1 mole) of alicyclic epoxy resin (Chisso Co., Trademark: Chissonox CX No. 221) and 15 g (0.1 mole) of cinnamic acid in a manner similar to Preparation 1. A clear, yellow, somewhat soft solid was obtained.

An analysis was made to determine whether or not the reaction had been completed and showed that less than 0.5 percent by weight of unreacted cinnamic acid was present. Both the infrared spectrum and the thin-layer chromatography tests showed the presence of epoxy resin modified by cinnamic acid.

Preparation 5

A reaction was carried out by 200°C for 10 hours using 35 g (0.1 mole) of epoxy resin (Shell Chemical Co., Trademark: Epikote No. 815) and 15 g (0.1 mole) of α-methylcinnamic acid in a manner similar to Preparation 1. A clear, yellow, somewhat soft solid was obtained.

An analysis was made to determine whether or not the reaction had been completed, and showed that less than 1 percent by weight of unreacted α-methylcinnamic acid was present. Both the infrared spectrum and the thin-layer chromatography tests showed the presence of epoxy resin modified by α-methylcinnamic acid.

Preparation 6

A reaction was carried out at 200°C for 10 hours using 30 g (0.1 mole) of epoxy resin (Shell Chemical Co., Trademark: Epikote No. 812) and 15 g (0.1 mole) of α-methylcinnamic acid in a manner similar to Preparation 1. A clear, yellow, somewhat soft solid was obtained.

An analysis was made to determine whether the reaction was complete and showed that less than 1 percent by weight of unreacted α-methylcinnamic acid was present. Both the infrared spectrum and the thin-layer chromatography tests showed the presence of epoxy resin modified by α-methylcinnamic acid.

Preparation 7

A reaction was carried out at 200°C for 20 hours using 100 g (0.1 mole) of epoxidized soybean oil (Adeka-Argus Chemical Co., Trademark: Adekacizer 0-130 P) and 15 g (0.1 mole) of α-methylcinnamic acid in a manner similar to Preparation 1. A clear, yellow, somewhat soft solid was obtained.

An analysis was made to determine whether the reaction was complete and showed that less than 3 percent by weight of unreacted α-methylcinnamic acid was present. Both the infrared spectrum and the thin-layer chromatography tests showed the presence of epoxidized oil modified by α-methylcinnamic acid.

Preparation 8

A reaction was carried out at 200°C for 10 hours using 35 g (0.1 mole) of epoxy resin (Shell Chemical Co., Trademark: Epikote No. 815) and 15 g (0.1 mole) of o-coumaric acid in a manner similar to Preparation 1. A clear, yellow, somewhat soft solid was obtained.

An analysis was made to determine whether the reaction was complete, and showed that less than 0.5 percent by weight of unreacted o-coumaric acid was present. Both the infrared spectrum and the thin-layer chromatography tests showed the presence of epoxy resin modified by o-coumaric acid.

Preparation 9

A reaction was carried out at 200°C for 10 hours 60 g (0.1 mole) of epoxidized linseed oil (Adeka-Argus Chemical Co., Trademark: Adekacizer 0-180) and 15 g (0.1 mole) of o-coumaric acid in a manner similar to Preparation 1. A clear, yellow, somewhat soft solid was obtained.

An analysis was made to determine whether the reaction had been completed and showed that unreacted o-coumaric acid was present only in an amount of less than 2 percent by weight. Both the infrared spectrum and the thin-layer chromatography tests showed the presence of epoxidized linseed oil modified by o-coumaric acid.

Preparation 10

A reaction was carried out at 200°C for 10 hours using 45 g (0.1 mole) of alicyclic epoxy resin (Chisso Co., Trademark: Chissonox CX 289) and 15 g (0.1 mole) of o-coumaric acid in a manner similar to Preparation 1. A clear, yellow, somewhat soft solid was obtained.

As analysis was conducted to determine whether or not the reaction had been completed, and showed that unreacted o-coumaric acid was present only in an amount of less than 1 percent by weight. Both the infrared spectrum and the thin-layer chromatography tests showed the presence of epoxy resin modified by o-coumaric acid.

EXAMPLE 1

To 100 parts of vinyl chloride resin (average degree of polymerization: 1000) were added 3 parts of calcium-zinc stabilizer (Akedka-Argus Chemical Co., Trademark: MARK 37), 2 parts of epoxidized soybean oil (Adeka-Argus Chemical Co., Trademark: Adekacizer 0-130 P), 1 part of octyltin mercaptide (Adeka-Argus Chemical Co., Trademark: MARK 465) and a lubricant (composed by 0.3 parts of stearic acid and 0.5 parts of Hoechstwax OP, made by Hoechst) (a composition here obtained is hereinafter referred to as Composition 1), and then 1.0 part of modified resin (pulverized) obtained by Preparation 1 was added. The ingredients were thoroughly mixed and the resulting mixture was kneaded for 4 minutes by means of mixing rolls which were heated to 180°C, then converted into sheets. Several sheets thus prepared were piled and pressed together by a press preheated to 180°C to form a resin plate having a thickness of 2 mm. Very little oder was detected during the kneading of the resin mixture by mixing rolls.

The resin plate hardly changed (A) in color by irradiating with a sterilization lamp for 8 hours, and had a slight brown color (B) by irradiating for 16 hours with the same lamp. It also has a slight brown (B) by irradiating with a sunshine carbon arc tester for 200 hours.

It was found from the above test results that the weather-ability of the resin mixture was improved.

EXAMPLE 2

Nine types of resin plates were prepared in the same manner as in Example 1, except that there were used the undermentioned parts of the modified resins obtained in Preparations 2 through 10, respectively, instead of the modified resin of Preparation 1.

| Modified resin preparation of Preparation | 2 | 1.5 parts |
|---|---|---|
| '' | 3 | 0.9 parts |
| '' | 4 | 0.9 parts |
| '' | 5 | 1.0 parts |
| '' | 6 | 0.9 parts |
| '' | 7 | 2.3 parts |
| '' | 8 | 1.0 parts |
| '' | 9 | 1.5 parts |
| '' | 10 | 1.2 parts |

Very little odor was detected when the resultant resin mixture was kneaded by mixing rolls.

The plates hardly changed (A) in color by irradiating with a sterilization lamp for 8 hours and had a slight brown color (B) by irradiating for 16 hours with the same lamp.

The plate blackened at 180°C after 80 minutes when the modified resin prepared in Preparation 3 or 6 was used, after 50 minutes when the modified resin prepared in Preparation 2, 7, 9 or 10 was used, and after 60 minutes when the modified resin prepared in Preparation 4, 5 or 8 was used.

Comparative Example 1

EXAMPLE 1 was repeated except that the modified resin of Preparation 1 was not used to prepare the resin plate.

The resin plate had a brown color (D) by irradiating with a sterilization lamp for 8 hours and a deep brown color (E) by irradiating for 16 hours with the same lamp. It also had a brown color (D) by irradiating with a sunshine carbon are tester for 200 hours. It was found, by comparing the above test results with that of EXAMPLE 1, that the resin plate using the agent for improving weatherability prepared in Preparation 1 was remarkably improved in weatherability.

Also the transparency of the plate obtained in EXAMPLE 1 was superior to that of the plate obtained in Comparative Example 1.

In addition, the blackening time measurement at 180°C of the resin plate obtained in Comparative Example 1 was 40 minutes, which was inferior to that (60 minutes) of the resin plate obtained in EXAMPLE 1.

Accordingly, it can be clearly seen that the resin plate using the agent for improving weatherability prepared in Preparation 1 is excellent in transparency and thermal stability in addition to weatherability.

Comparative Example 2

EXAMPLE 1 was repeated that 0.7 parts of Epikote No. 815, 0.6 parts of Epikote No. 812, 1.2 parts of Adekacizer 0-180 or 0.6 parts of Chissonox CX 221, respectively were each used separately as the epoxy resin instead of the modified resin of EXAMPLE 1 to prepare four resin plates.

All the resin plates had a brown color (D) by irradiating with a sterilization lamp for 8 hours and a deep brown color (E) by irradiating for 16 hours with the same lamp.

The transparency of each plate was inferior to that of the plate obtained in EXAMPLE 1, much the same as that of the plate obtained in Comparative Example 1.

The blackening time of each plate at 180°C was about 40 minutes.

It was found from the above test results that all the epoxy resins used above had no effect on improving weatherability.

Comparative Example 3

EXAMPLE 1 was repeated except that 0.3 parts of cinnamic acid, α-methylcinnamic acid or o-coumaric acid, respectively, were each used separately in place of the modified resin of EXAMPLE 1 to prepare three resin plates.

A marked strong odor was detected through the kneading of all the resin mixtures by mixing rolls.

All the resin plates had a slight brown color (B) by irradiating with a sterilization lamp for 8 hours and had a light brown color (C) by irradiating for 16 hours with the same lamp.

The blackening time at 180°C was 30 minutes.

It can clearly be seen from these results that the resin plate using the agent for improving weatherability of this invention is superior to those plates which contain only one of cinnamic acid, α-methylcinnamic acid or o-coumaric acid. In addition, the thermal stability of such plates decreases in contrast to those which contain the agent for improving weatherability of this invention.

Comparative Example 4

EXAMPLE 1 was repeated except that 0.3 parts of cinnamic acid with 0.7 parts of Epikote No. 815, 0.3 parts of α-methylcinnamic acid with 0.6 parts of Epikote No. 812 or 0.3 parts of o-coumaric acid with 1.2 parts of Adekacizer-0-180 respectively, were each used separately in place of the modified resin obtained in Preparation 1 to prepare three resin plates.

A marked strong odor was detected through the kneading of all the resin mixture by mixing rolls.

All the resin plates had a slight brown color (B) by irradiating with a sterilization lamp for 8 hours and had a light brown color (C) by irradiating for 16 hours with the same lamp.

The blackening time at 180°C was 40 minutes for all plates and the transparency of all the plates was inferior to the one obtained in EXAMPLE 1.

It can be clearly seen from the test results that even the resin plates using at least one of cinnamic acid, α-methylcinnamic acid or o-coumaric acid together with an epoxy resin but unmodified through a reaction with an epoxy resin are inferior to those containing the agent for improving weatherability of the invention.

Comparative Example 5

EXAMPLE 1 was repeated except that 0.3 parts of a benzophenonone compound (Harimakasei Co., Trademark:Harisobu-108) or 0.25 parts of a benzotriazole compound (Ciba-Geigy, Trademark: Tinuvin P) respectively, (each is a known agent for improving weatherability) were each used separately in place of the modified resin obtained in Preparation 1 to prepare two resin plates.

Both of the resin plates hardly changed (A) in color by irradiating with a sterilization lamp for 8 hours and had a slight brown color (B) by irradiating for 16 hours with the same lamp.

The blackening time at 180°C was 40 minutes.

It can be clearly seen from these test results that the plates employing the agent for improving weatherability obtained in accordance with this invention provide substantially better properties when compared with plates employing known agents for improving weatherability and thermal stability.

EXAMPLE 3

In this example, the agent for improving weatherability (Preparation 1) was added prior to the starting of the polymerization.

Thus, into a 140 litre stainless autoclave provided with a stirrer were placed 200 parts of deionized water, 0.2 parts of partially saponified polyvinyl alcohol (dispersing agent), the degree of saponification being 80 percent, and 0.1 part of diisopropyl peroxycarbonate (initiator), and then 1.0 part of modified resin (pulverized) obtained by Preparation 1 was added. The autoclave was placed under a vacuum in order to remove oxygen gas. Then, 100 parts of vinyl chloride monomer was charged. The reaction mixture was heated to 58°C and allowed to polymerize for 10 hours. The polymer formed was separated by means of a centrifuge and dried to obtain vinyl chloride resin (average degreee of polymerization measured according to JIS K 6721 : 1020).

The same auxiliary ingredients as EXAMPLE 1, except the modified resin obtained in Preparation 1, were added to 100 parts of the above vinyl chloride resin. The mixture was treated in the manner same as EXAMPLE 1 to provide a resin plate. The resin plate showed very similar color to the plate of EXAMPLE 1 by irradiating with a sterilization lamp for 8 or 16 hours.

The blackening time of the plate measured at 180°C was 70 minutes.

It was found from above test results that the agent for improving weatherability of the invention which was used prior to the polymerization has an analogous effect to the one which was used after the polymerization.

EXAMPLE 4

To 100 parts of a graft copolymer (average degree of polymerization was 520, and content of ethylene-vinyl acetate copolymer was 8%) were added 3 parts of calcium-zinc stabilizer (Adeka-Argus Chemical Co., Trademark: MARK 37), 0.5 parts of octyltin mercaptide (Adeka-Argus Chemical Co., Trademark: MARK 465) and 0.5 parts of lubricant (Hoechst wax OP, made by Hoechst) (a composition obtained here is hereinafter referred to as Composition 2), and then 0.8 parts of the modified resin (pulverized) obtained by Preparation 2 was added. The ingredients were thoroughly mixed and the resultant mixture was kneaded for 4 minutes by means of mixing rolls at 170°C, then converted into sheets. Several thus prepared were piled and pressed together by a press preheated to 170°C to provide a resin plate having a thickness of 2 mm.

Very little odor was detected through the kneading of the resinous mixture by mixing rolls.

The resin plate did not change (A) in color by irradiating with a sterilization lamp for 8 hours, and had a slight brown color (B) by irradiating for 16 hours with the same lamp. It also had a slight brown color (B) by irradiating with a sunshine carbon arc tester for 200 hours.

Transparency of the plate was satisfactory. The blackening time of the plate at 180°C was 50 minutes.

Comparative Example 6

EXAMPLE 4 was repeated, except that the modified resin obtained in Preparation 2 was not used to prepare the resin plate.

The resin plate had a light brown color (C) by irradiating with a sterilization lamp for 8 hours and a brown color (D) by irradiating for 16 hours with the same lamp. It had a considerably deep brown color (E) by irradiating with a sunshine arc tester for 200 hours.

The transparency of the pressed plate was somewhat inferior to the one obtained in EXAMPLE 4. The blackening time at 180°C was 30 minutes.

It can be clearly seen from these test results that the agent for improving weatherability obtained in Preparation 2 has a remarkable effect on improving the weatherability and also providing excellent transparency and thermal stability properties.

EXAMPLE 5

To 100 parts of vinyl chloride-ethylene copolymer (average degree of polymerization was 800, and ethylene content was 5%) was added Composition 2 used in EXAMPLE 4, and then 1.0 part of the modified resin (pulverized) obtained in Preparation 1 was added to them. They were thoroughly mixed and treated in a manner similar to EXAMPLE 4 to provide a resin plate having a thickness of 2 mm.

Very little odor was detected through the kneading of the resin mixture.

The resin plate hardly changed (A) in color by irradiating with a sterilization lamp for 8 hours, and had a slight brown color (B) by irradiating for 16 hours with the same lamp.

The transparency of the resin plate was satisfactory. The blackening time of the pressed plate at 180°C was 60 minutes.

Comparative Example 7

EXAMPLE 5 was repeated, except that the modified resin obtained in Preparation 1 was not used to prepare the resin plate.

The transparency of the resin plate was somewhat inferior to the one obtained in EXAMPLE 5.

The resin plate had a light brown color (C) by irradiating with a sterilization lamp for 8 hours and a brown color (D) by irradiating for 16 hours with the same lamp. The blackening time at 180°C was 40 minutes.

EXAMPLE 6

To 100 parts of chlorinated vinyl chloride resin (average degree of polymerization was 800, and chlorine content was 67%) was added Composition 2 used in EXAMPLE 4, and then the modified resin (pulverized) obtained in Preparation 1 was added to them. They were thoroughly mixed and kneaded by means of mixing rolls which were heated to 190°C, then converted into sheets. The sheets were piled and pressed together by a press preheated to 190°C to provide a resin plate having the thickness of 2 mm.

Very little odor was detected through the kneading of the resin mixture.

The resin plate hardly changed (A) in color by irradiating with a sterilization lamp for 8 hours, and had a slight brown color (B) by irradiating for 16 hours with the same lamp. The blackening time at 180°C was 60 minutes.

Comparative Example 8

EXAMPLE 6 was repeated except that the modified resin obtained in Preparation 1 was not used to prepare the resin plate.

Thee resin plate had a light brown color (C) by irradiating with a sterilization lamp for 8 hours and a deep brown color (E) by irradiating for 16 hours with the same lamp. The blackening time at 180°C was 50 minutes.

EXAMPLE 7

To 100 parts of acrylic resin (Deltaplastics Co., Delpowder-7ON) was added 1.0 part of the modified resin (pulverized) obtained in Preparation 1. The resultant mixture was kneaded by means of mixing rolls heated to 160°C, and converted into sheets. Several sheets were piled and pressed together by a press at 180°C to provide a resin plate having a thickness of 2 mm.

The resin plate did not change in its apparance by irradiating with a sterilization lamp for 8 or 16 hours.

Comparative Example 9

EXAMPLE 7 was repeated except that the modified resin obtained in Preparation 1 was not used to prepare the resin plate.

The resin plate had a slight brown color (B) by irradiating with a sterilization lamp for 8 hours and a light brown color by irradiating for 16 hours with the same lamp. The plate was cracked in the surface portion in the latter case.

It can be clearly seen from these test results that the agent for improving weatherability of the invention also has a remarkable effect on acrylic resins which are known to have good weatherability properties among the synthetic resins. In particular, as the result of preventing cracking (which was noticed in Comparative Example 9), by use of the agent for improving weatherability of this invention in EXAMPLE 7, a disadvantage of acrylic resin, when used in the outdoors, was overcome to increase the use in application fields for the acrylic resins.

EXAMPLE 8

To 100 parts of polyester resin (Dainippon Ink Chemical Co., Polylite 8007) was added 1.25 parts of hardening agent (Kayaku Noury Co., Kayamek), then 1.0 part of the modified resin of Preparation 1 (pulverized) was added to them. They were thoroughly mixed to form a homogenous solution. A part of the solution was flowed onto a glass plate in a thickness of 2.0 mm and placed in an oven at 60°C for 5 hours at form a polyster plate.

The plate had a slight yellow-green color by irradiating with a sterilization lamp for 8 hours, and a light yellow-green color by irradiating for 16 hours with the same lamp.

Comparative Example 10

EXAMPLE 8 was repeated except that the modified resin obtained in Preparation 1 was not used to prepare the resin plate.

The plate had a light yellow-green color by irradiating with a sterilization lamp for 8 hours and a yellow-green color by irradiating for 16 hours with the same lamp.

It can be clearly seen from these test results that the agent for improving weatherability of this invention is also effective on polyester resin.

In place of the particular resins, agent for improving weatherability and other ingredients employed in the foregoing Examples, other resins, agents for improving weatherability and ingredients as hereinbefore described may be employed in the present invention in substantially the same manner to obtain substantially the same results.

What is claimed is:

1. An improved resin composition which comprises 100 parts by weight of polyvinyl chloride and 0.1 – 5.0 parts by weight of a reaction product which is prepared by reacting an epoxy resin selected from the group consisting of glycidyl epoxy resins, epoxidized vegetable oils and alicyclic epoxy resins with at least one acid selected from the group consisting of cinnamic acid, γ-methylcinnamic acid and o-coumaric acid.

2. The resin composition of claim 1 wherein the epoxy resin is selected from the group consisting of bisphenol-A glycidyl ether, glycerol triglycidyl ether, epoxidized linseed oil and epoxidized soybean oil.

3. The resin composition of claim 1 wherein the reaction product is prepared by employing the acid and the epoxy resin in a ratio such that number of moles of the acid is less than that of the epoxy groups present in the epoxy resin.

* * * * *